(12) United States Patent
Voigtlaender et al.

(10) Patent No.: US 6,985,117 B2
(45) Date of Patent: Jan. 10, 2006

(54) HF WHEEL RIM ANTENNA HAVING SEVERAL PATCH ANTENNAS

(75) Inventors: Klaus Voigtlaender, Wangen (DE); Michael Thiel, Leonberg (DE); Wilfried Tenten, Gammertingen (DE); Klaus Damm, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 10/824,115

(22) Filed: Apr. 13, 2004

(65) Prior Publication Data
US 2004/0263404 A1 Dec. 30, 2004

(30) Foreign Application Priority Data
Apr. 17, 2003 (DE) ................................. 103 17 689

(51) Int. Cl.
*H01Q 1/32* (2006.01)
(52) U.S. Cl. ...................... 343/711; 343/713; 340/444
(58) Field of Classification Search ......... 343/700 MS, 343/704, 711, 712, 713, 853; 340/444
See application file for complete search history.

(56) References Cited

U.S. PATENT DOCUMENTS

| | | | |
|---|---|---|---|
| 6,400,325 B2 * | 6/2002 | Aaltonen | 343/711 |
| 6,722,192 B2 * | 4/2004 | Benedict et al. | 73/146 |
| 6,791,457 B2 * | 9/2004 | Shimura | 340/448 |
| 2002/0190852 A1 * | 12/2002 | Lin | 340/445 |
| 2003/0197604 A1 * | 10/2003 | Ogawa et al. | 340/445 |
| 2004/0150516 A1 * | 8/2004 | Faetanini | 340/444 |

* cited by examiner

*Primary Examiner*—Tho Phan
(74) *Attorney, Agent, or Firm*—Kenyon & Kenyon

(57) ABSTRACT

A system for wireless data transmission between a stationary transmitting/reception device and a rotating body, e.g., a vehicle wheel, having secondary antennas, is provided. A plurality of stationary primary antennas are coupled to the stationary transmitting/reception device, and a plurality of secondary antennas are positioned along a circumference of the rotating body. Amongst the plurality of primary antennas, at least one primary antenna is provided for transmitting electrical energy to the secondary antennas, and at least one other primary antenna is provided for communications with the secondary antennas. In this manner, data transmission independent of the speed of the rotating body and the position of the secondary antennas is achieved.

11 Claims, 2 Drawing Sheets

HF WHEEL RIM ANTENNA HAVING SEVERAL PATCH ANTENNAS

FIELD OF THE INVENTION

The present invention relates to a device for wireless data transmission between a stationary transmission/reception device (primary antenna) and an antenna set-up (secondary antenna) situated on a rotating body, e.g., in a vehicle tire.

BACKGROUND INFORMATION

Systems for wireless data transmission that utilize the energy contained in the field of the transmitting antenna for data transmission are also known as TAG systems. These systems include a primary antenna for sending a carrier signal to a secondary antenna using an electronic system which, while utilizing the energy contained in the radio hop, transmits back a useful signal (measuring signal) to the primary antenna. The useful signal is evaluated in the reception section of the primary antenna by an evaluation unit. In a system at rest, i.e., the primary and secondary antenna are situated in a stationary manner, this data transmission causes relatively few problems. Data transmission from a fast moving or rotating system, such as a vehicle tire, on the other hand, is limited to certain positions of the rotating body and/or the secondary antenna system positioned on it, or is a function of the speed of the moving body.

Therefore, it is an object of the present invention to provide a system for wireless data transmission between a primary side transmission/reception device, e.g., stationarily positioned transmission/reception device, and a secondary antenna device positioned on a rotating body, which makes possible in a simple way data transmission that is independent of the position and the speed of the rotating body.

SUMMARY

The above object is achieved according to the present invention in that a data transmission system is provided with several stationarily positioned primary antennas and several secondary antennas which are positioned along a circumference of the rotating body. The primary antennas, in this context, are operated in such a way that at least one of the primary antennas (from here on designated as transmitting antenna) radiates a carrier signal (radio signal) for transmitting electrical energy to the secondary antennas, while another of the primary antennas (from here on designated as communications antenna) is used for communications with the secondary antennas. In this manner, an electronic system positioned on the rotating body may be constantly supplied with energy. Consequently, energy supply and data transmission can take place simultaneously. Because of the configuration having several primary antennas, and several secondary antennas that are positioned along a circumference of the rotating body, e.g., evenly distributed along the circumference, communication is ensured independent of the position or the speed of the rotating body.

The data transmission between a primary side communications antenna and the secondary antennas can take place either continuously or at predefined times, e.g., upon request of a stationarily positioned processing unit. For non-continuous data transmission, considerable power savings can be achieved.

In the case of the secondary antennas, flat dipole antennas may be used, e.g., patch antennas (slot antennas). Because of the flat antenna structure of the secondary antennas, it is possible to position them on an elastic carrier band, which, in the case of a vehicle tire, may be placed about the wheel rim as a rim band. A rim band has the advantage that it can very easily be retrofitted. Alternatively, the secondary antennas may also be fastened directly to the rim, e.g., adhesively bonded to the rim.

For the application of the data transmission system according to the present invention in a motor vehicle, the primary antennas may be situated in a wheel housing of a vehicle. In this context, the primary antennas may have a main radiation direction, which points in the direction of the wheel downwards in a slantwise manner. This has the advantage that neighboring vehicles are substantially unimpaired by the transmitting lobe directed at the ground.

The transmitting antennas are, in addition, situated in such a way that they are essentially screened off from one another, for example. One exemplary position for the primary antennas is the lower part of a wheel housing of a vehicle at opposite sides. In this manner, the primary antennas are screened off from each other by the wheel, so that no mutual impairment can occur.

The system for wireless data transmission according to the present invention includes a processing unit positioned on the primary antenna side, which controls the transmission and communications operation of the primary antennas. The processing unit is arranged in such a way that a primary antenna may be operated in transmitting operation for supplying the secondary antennas with energy, or operated in communications operation for data exchange. In this manner, at least one of the primary antennas is able to be switched between transmission and communications operation. This has the advantage that all the primary antennas are able to operate as transmitting antennas as long as there is no demand for a data exchange. When there is a demand for data on the part of the processing unit, one of the transmitting antennas may be simply switched to communications operation.

The data transmitting device according to the present invention includes an electronic system situated on the primary antenna side, which makes possible a synchronization of the communications antenna with the carrier signal of a transmitting antenna. By a phase-synchronized operation of the transmitting antenna and the communications antenna, the communications operation is not interfered with. The synchronization of the communications antenna with the carrier signal of the transmitting antenna is implemented, for example, in that a reflected carrier signal of the transmitting antenna which was reflected, e.g., by at least one of various objects in the proximity of the tire (wheel housing, axle, roadway, etc), is received by the communications antenna, the carrier signal is filtered out, and the signal of the communications antenna is synchronized, e.g., with the aid of a PLL (phase-locked loop).

The primary antennas work at a carrier frequency in the GHz range, e.g., 2.45 GHz. This has the advantage that data can be transmitted in a relatively short time.

Useful signals, which are transmitted from the antennas on the secondary antenna side to the evaluation device situated on the primary antenna side, may be transmitted in the form of signals having quadratic amplitude modulation. In this context, essentially the carrier signal is added to the useful signal and squared. This kind of modulation has the advantage that very few components are required and relatively little power is required.

In accordance with the present invention, energy storage mechanism is provided on the secondary antenna side, which mechanism stores the energy transmitted by the primary antennas. In this manner, even when the energy absorption over the radio hop is low, a continuous energy supply can be ensured.

The secondary antennas situated on the rotating body may have several rows, e.g., parallel rows. The individual rows of the secondary antennas may have a slightly different radiation direction and may radiate, for example, not only perpendicularly to their base plane, but also slightly towards one another. In this manner, by the aggregate interference among the fields of the secondary antennas, a concentration of the transmitted energy may be achieved.

According to another exemplary embodiment of the present invention, on the secondary antenna side, for example, a device is provided which selects a group of one or more secondary antennas for data exchange, which group is situated favorably for communications with the communications antenna. This has the advantage that not all secondary antennas need to participate in the communications, and therefore energy is saved.

For example, the selection of the group may be made according to a method in which first one of the secondary antennas transmits a signal to the primary antennas, and a processing unit situated on the primary side, e.g., a microcontroller, ascertains from the intensity of the signal whether this antenna is favorably placed for a subsequent communication. If the signal of the secondary antenna is sufficiently strong, and thus the secondary antenna is suitably placed, a data exchange may be carried out solely via this secondary antenna. Optionally, a neighboring secondary antennas, along with the selected first secondary antenna, may also be used for communications. Those antennas which are not needed for the communications operation may be switched to receiving operation, and used purely for energy input. If the signal radiated by the secondary antenna, or group of secondary antennas, is not sufficiently strong, a new group of secondary antennas is selected by the electronic system situated on the secondary antenna side, and once again a signal is transmitted to the primary antennas. This process is repeated until a suitable group of secondary antennas is found.

At higher rotational speeds of the rotating body, selection of specific secondary antennas for data exchange is usually no longer necessary, since one of the secondary antennas will travel past the communications antenna on the primary side within a sufficiently short period of time to transmit measured data. Therefore, once a threshold speed limit is reached, e.g., 10–15 km/h in the case of a motor vehicle, a group of a few secondary antennas may be selected to carry out the communications operation. This selected group of secondary antennas may include at least two secondary antennas which lie diametrically opposite each other. The remaining secondary antennas may be switched to performing solely reception operation.

DETAILED DESCRIPTION

Figure 1:
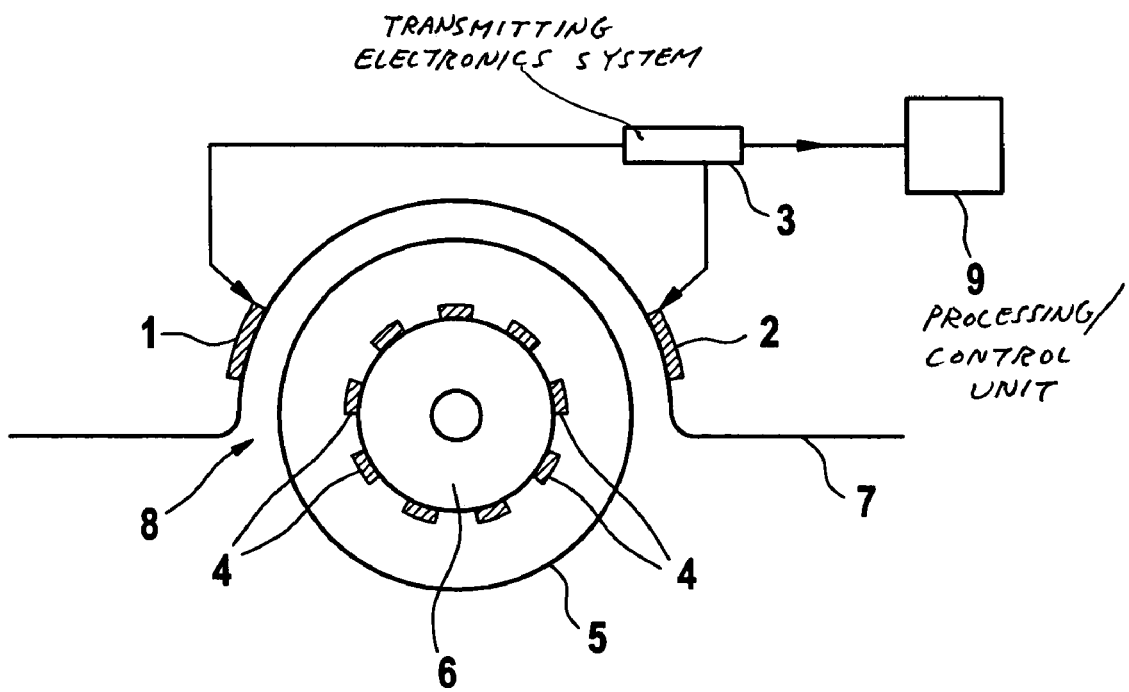
FIG. 1 a schematic diagram of a wheel rim antenna system according to an example embodiment of the present invention.

FIG. 1 shows a wheel rim antenna system for transmitting data, e.g., the tire pressure or the tire temperature, from the interior of a vehicle tire 5. The antenna system includes two primary antennas 1, 2 that are situated in wheel housing 8 of a vehicle 7, and several secondary antennas 4 situated on a wheel rim 6. In this context, the secondary antennas 4 are positioned in circular fashion at the outer circumference of wheel rim 6.

Primary antennas 1, 2 may be normally operated in such a way that both primary antennas 1, 2 operate as transmitting antennas to supply a sub-system including the secondary antennas 4 and an associated electronics system 11 (shown in FIG. 2) on the secondary antenna side with energy. Primary antenna 2 may be switched over to communications operation if an instruction to read out data from wheel 5 is provided from a processing/control unit 9. Therefore, primary antenna 2 may also be designated as a communications antenna 2, and primary antenna 1 may also be designated as a transmitting antenna 1. In this operational configuration, the transmitting antenna 1 radiates a radio hop for the input of electrical energy into the sub-system 4, 11 on the secondary antenna side, and the communications antenna 2 is provided for communications with secondary antenna 4. The data exchange occurs in wireless manner. Because the energy required for operating the sub-system 4, 11 on the secondary antenna side is supplied by the radio hop of primary antennas 1, 2 (additional primary antennas may also be provided), an independent energy supply is not required on the secondary antenna side.

During a data exchange, transmitting antenna 1 remains in transmitting operation, in order to supply secondary antennas 4 with energy. The transmitting operation and the communications operation are carried out by a transmitting/reception electronics system 3 connected to primary antennas 2 and processing/control unit 9. Transmitting/reception electronics system 3 may be used, in this context, for modulation and demodulation of useful signals with, or from, a carrier system, but the transmitting electronics may also be used, for instance, to synchronize primary antennas 1, 2 with each other, as explained below.

One advantage of the above-descried antenna system having several primary antennas 1, 2 and several secondary antennas situated on a circumference of a rotating body, e.g., a wheel rim 6 of a wheel 5, is that it makes possible a data exchange, e.g., continuous data exchange, between the rotating body and the processing unit 9 which is stationary, where the data transmission is ensured completely independent of the rotational speed of the rotating body. In addition, there is no need for an independent energy supply, such as a battery, on the rotating body.

As shown in FIG. 1, the primary antennas are situated in the lower region of the wheel housing 7, and the primary antennas have a main radiating direction towards wheel 5, i.e., slantwise down onto the roadway. In this manner, interference with neighboring vehicles is substantially prevented.

In this context, primary antennas 1 and 2 are positioned in such a way that the radio hop is attenuated as little as possible. For example, the distance between one of the primary antennas 1, 2 and one of the secondary antennas 4 may be approximately 20 cm.

Primary antennas 1 and 2 may normally operate at a carrier frequency in the gigahertz (GHz) range. The use of a frequency in the ISM (industrial, scientific, medical) range, e.g., 2.45 GHz, may be chosen.

Communications antenna 2 may be synchronized with the carrier signal of transmitting antenna 1, in order to make possible an energy input via the radio hop of transmitting antenna 1 and a simultaneous data exchange. The synchronization can, for example, be achieved by: the communications antenna 2 receiving a signal reflected by one or more objects in the environment of wheel 5, e.g., the wheel housing, the roadway, the steel belt of the tire, etc; filtering out the carrier signal; and synchronizing with this carrier signal. This synchronization may be achieved, for example, with the aid of a PLL (phase-locked loop). The electronics system required for this may be included in the transmitting/reception electronics system 3.

Figure 2:
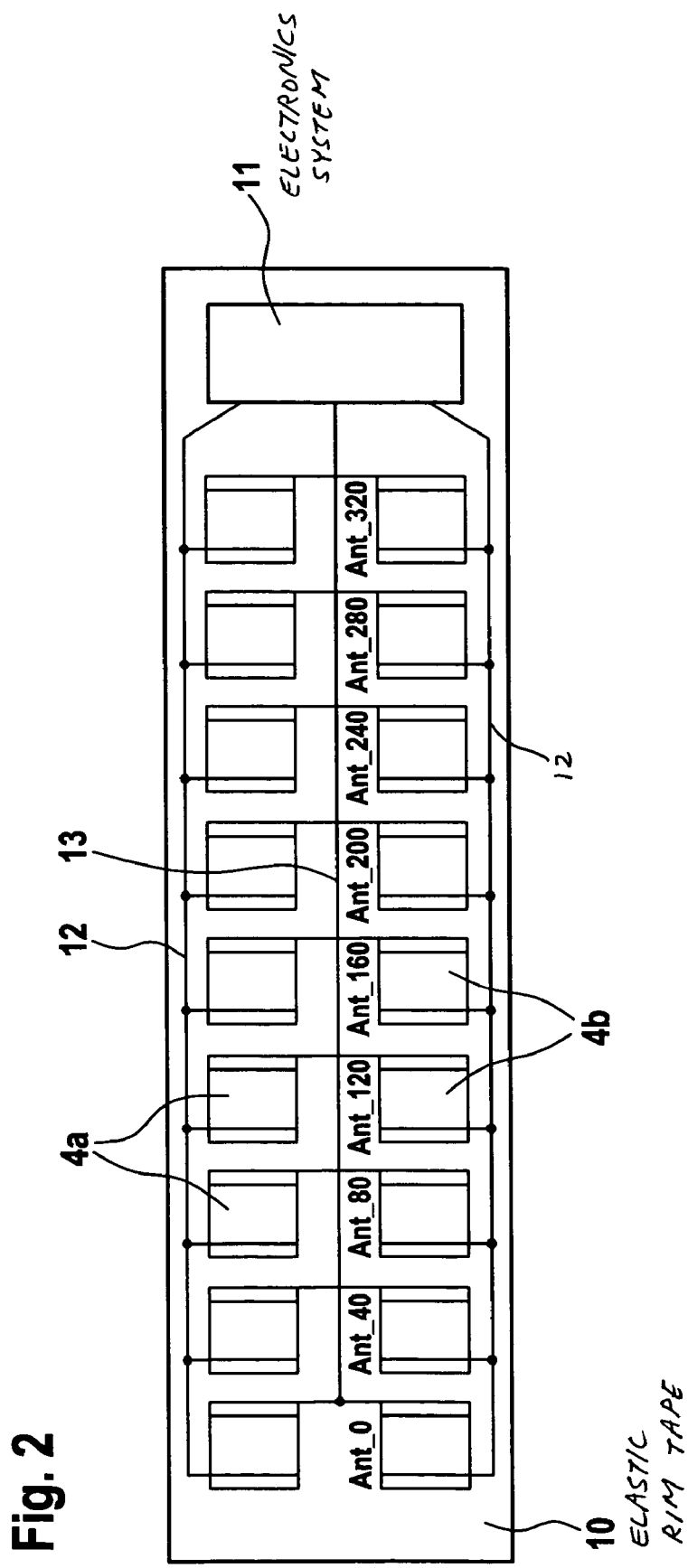
FIG. 2 shows a rim tape according to an example embodiment of the present invention having several secondary antennas.

As mentioned above, the sub-system on the secondary antenna side includes the secondary antennas 4 and the electronics system 11 connected to the secondary antennas (see FIG. 2). The electronics system 11 includes an HF receiving part, a modulator, an oscillator, and a desired sensor system.

The signals generated by the wheel sensor system, or other desired data, are transmitted, with the aid of a suitable modulation technique, to communications antenna 2. In this context, an energy-saving modulation technique may be used, e.g., the quadratic amplitude modulation, in which the carrier signal and the useful signal are added and the result is squared. The power of the overall signal generated in this manner is expressed by the following equation:

$$P(t)=[P_T(t)+P_S*\cos(2*\pi*fc*t)]^2 = P_T^2(t)+P_S^2*\cos^2(2*b*fc*t)+2*P_S*P_T(t)*\cos(2*\pi*fc*t).$$

In the above equation, $P(t)$ is the power of the overall signal, $P_T(t)$ is the power of the carrier signal, and $P_S$ is the power of the useful signal. The terms $P(t)^2$ and $\cos^2(2*\pi*fc*t)$ play a subordinate role since they are filtered by transmitting/reception electronics system 3. The advantage of the quadratic amplitude modulation is in the last term of the binomial formula, in which the factor 2 appears.

The energy received from the radio hop of the transmitting antenna 1 may be stored in a charge-coupled memory which is contained in electronics system 11 that is situated on the secondary antenna side.

Operating all secondary antennas 4 in communications mode requires relatively high energy expenditure. Therefore, one sub-group of secondary antennas 4 may be selected for communications operation at the same time. For the selection of the sub-group of secondary antennas 4 via which a data exchange is to take place, an electronic selection circuit is provided which, for example, may be a component of the electronics system 11. The selection circuit selects a secondary antenna 4 which is positioned close to the communications antenna 2, for example. The position of the secondary antenna 4 may, for example, be ascertained by the intensity of one of the carrier signals emitted by the secondary antenna 4. If the signal received by communications antenna 2 exceeds a predefined minimum threshold level, communications take place with that particular secondary antenna 4 which emitted the signal, and, if necessary, with neighboring secondary antennas 4. The remaining secondary antennas 4 may, in the meantime, continue to operate in receiving mode and absorb transmitted energy.

The embodiment of the wheel rim antenna device shown in FIG. 1 operates in such a way that, beginning at a predefined threshold speed of wheel 5, only a sub-group of the secondary antennas 4 still operate in the communications-operation mode. This is sufficient at speeds exceeding the predefined threshold speed since the sub-group of the secondary antennas 4 travel past the communications antenna 2 sufficiently often. The remaining secondary antennas may operate only in receiving-operation mode, or may be deactivated.

FIG. 2 shows an elastic rim tape 10 on which several secondary antennas 4 are situated, as well as the electronics system 11 connected to the secondary antennas, which electronics system 11 has a sensor system. In this example embodiment, the secondary antennas 4 are situated in two rows parallel to each other, one row including secondary antennas designated 4a and the other row including secondary antennas designated 4b. In this example embodiment, the secondary antennas may be so-called patch antennas or slot antennas, which have a particularly flat construction. Patch antennas may have an antenna length between 2 and 6 cm.

As shown in FIG. 2, the two rows of secondary antennas are connected to the electronics system 11 by connecting lines designated by reference numerals 12 and 13.

Each of the two rows of secondary antennas 4a and 4b may have a main emitting direction that faces slightly towards the other row. In this manner, a concentration of transmission energy and increased antenna gain may be achieved.

What is claimed is:

1. A system for wireless data transmission, comprising:
   a plurality of stationary primary antennas; and
   a plurality of secondary antennas situated on a rotating body;
   wherein a first primary antenna transmits electrical energy to the secondary antennas, and a second primary antenna is provided for at least bi-directional communications for data exchange with the secondary antennas, and wherein the primary antennas are situated on a wheel housing of a vehicle, and wherein the main emitting direction of the primary antennas is towards the direction of a corresponding wheel in the wheel housing, and at an angle downwards relative to a horizontal plane of a road surface below the wheel.

2. The system as recited in claim 1, wherein the secondary antennas are positioned on a carrier band placed on the rotating body.

3. The system as recited in claim 2, wherein the carrier band is a rim band positioned on a circumference of a wheel rim.

4. The system as recited in claim 1, further comprising:
   a processing unit for controlling the energy transmitting operation and the communications operation of the primary antennas, wherein the processing unit is able to change the operation mode of the second primary antenna between the communications operations for data exchange and the transmitting operation for the energy transmission.

5. The system as recited in claim 4, further comprising:
   an energy storage medium connected to the secondary antennas for storing the energy transmitted by the primary antennas.

6. The system as recited in claim 4, wherein the secondary antennas are arranged in a plurality of rows.

7. The system as recited in claim 1, further comprising:
   a synchronization device for synchronizing the second primary antenna operating in the communications operation mode with the first primary antenna operating in the energy transmitting operation mode.

8. The system as recited in claim 7, wherein the primary antennas operate at a carrier frequency approximately in the gigahertz range.

9. The system as recited in claim 7, wherein a quadratic amplitude modulation is used for data transmission from the secondary antennas to the primary antennas.

10. The system as recited in claim 7, further comprising:
a selection device for selecting a desired number of secondary antennas among the plurality of secondary antennas for communications with at least one of the first and second primary antennas.

11. The system as recited in claim 7, further comprising:
a selection device for deactivating, if the vehicle exceeds a predefined speed, a first selected number of the secondary antennas and operating a second selected number of secondary antennas for communications with at least one of the first and second primary antennas.

* * * * *

UNITED STATES PATENT AND TRADEMARK OFFICE
CERTIFICATE OF CORRECTION

PATENT NO.        : 6,985,117 B2                                                Page 1 of 1
APPLICATION NO. : 10/824115
DATED             : January 10, 2006
INVENTOR(S)       : Voigtlaender et al.

It is certified that error appears in the above-identified patent and that said Letters Patent is hereby corrected as shown below:

Column 5, line 25, change "(2*b*fc*t)" to -- (2*π*fc*t) --.

Signed and Sealed this

Fourth Day of March, 2008

JON W. DUDAS
*Director of the United States Patent and Trademark Office*